(12) United States Patent
Okamoto et al.

(10) Patent No.: US 10,638,120 B2
(45) Date of Patent: Apr. 28, 2020

(54) INFORMATION PROCESSING DEVICE AND INFORMATION PROCESSING METHOD FOR STEREOSCOPIC IMAGE CALIBRATION

(71) Applicant: Sony Interactive Entertainment Inc., Tokyo (JP)

(72) Inventors: Hirofumi Okamoto, Tokyo (JP); Shoichi Ikenoue, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 23 days.

(21) Appl. No.: 15/567,774

(22) PCT Filed: May 13, 2016

(86) PCT No.: PCT/JP2016/064314
§ 371 (c)(1),
(2) Date: Oct. 19, 2017

(87) PCT Pub. No.: WO2016/186031
PCT Pub. Date: Nov. 24, 2016

(65) Prior Publication Data
US 2018/0167607 A1 Jun. 14, 2018

(30) Foreign Application Priority Data
May 20, 2015 (JP) .................. 2015-103183

(51) Int. Cl.
*A63F 13/23* (2014.01)
*H04N 13/332* (2018.01)
(Continued)

(52) U.S. Cl.
CPC .......... *H04N 13/332* (2018.05); *A63F 13/23* (2014.09); *G01B 11/00* (2013.01); *G01B 11/26* (2013.01);
(Continued)

(58) Field of Classification Search
CPC .......................... H04N 13/332; H04N 13/246
See application file for complete search history.

(56) References Cited

U.S. PATENT DOCUMENTS 8,612,180 B2 * 12/2013 Yan ................. G06F 9/5066
702/127
9,167,231 B2 10/2015 Kawakami
(Continued)

FOREIGN PATENT DOCUMENTS

EP 0999518 A1 5/2000
JP 2008070120 A 3/2008
(Continued)

OTHER PUBLICATIONS

Eijkhout, Victor, "Introduction to Parallel Computing", Texas Advanced Computing Center, Sep. 2011, pp. 1-42, [retrieved on Jan. 6, 2019], Retrieved from the Internet <URL:https://pdfs.semanticscholar.org/0156/3cf0c88f7d3830f1813a097e7574cee70b74.pdf> (Year: 2011).*
(Continued)

*Primary Examiner* — Terrell M Robinson
(74) *Attorney, Agent, or Firm* — Matthew B. Dernier, Esq.

(57) ABSTRACT

An information processing device causes an information processing section to perform information processing of a game for example, based on a user's operation received by an input information acquiring section and on images acquired by a stereo camera and obtained through an acquired image obtaining section. The information processing device causes an output data generating section to output the result of the information processing to a display device. At this point, a tracking processing section detects corresponding marker images from stereoscopic images and, based on a parallax therebetween, obtains position information about a target object. In accordance with vertical position misalignment between the detected marker images,
(Continued)

a calibration determining section determines whether camera calibration is needed and requests the output data generating section to notify the user of the determined need.

7 Claims, 8 Drawing Sheets

(51) Int. Cl.
| | |
|---|---|
| *G01B 11/00* | (2006.01) |
| *H04N 5/64* | (2006.01) |
| *G01B 11/26* | (2006.01) |
| *G01C 3/06* | (2006.01) |
| *G06F 3/0346* | (2013.01) |
| *G06F 3/01* | (2006.01) |
| *H04N 13/30* | (2018.01) |
| *H04N 13/246* | (2018.01) |
| *G02B 27/01* | (2006.01) |

(52) U.S. Cl.
CPC ............... *G01C 3/06* (2013.01); *G06F 3/01* (2013.01); *G06F 3/011* (2013.01); *G06F 3/0346* (2013.01); *H04N 5/64* (2013.01); *H04N 13/246* (2018.05); *H04N 13/30* (2018.05); *G02B 2027/014* (2013.01)

(56) References Cited

U.S. PATENT DOCUMENTS

| | | | | |
|---|---|---|---|---|
| 9,503,703 | B1* | 11/2016 | Ramaswamy | H04N 13/246 |
| 2008/0080789 | A1* | 4/2008 | Marks | A63F 13/06 |
| | | | | 382/296 |
| 2008/0117290 | A1* | 5/2008 | Mazza | H04N 13/239 |
| | | | | 348/47 |
| 2008/0276262 | A1* | 11/2008 | Munshi | G06F 8/41 |
| | | | | 719/328 |
| 2011/0157195 | A1* | 6/2011 | Sprangle | G06T 1/20 |
| | | | | 345/522 |
| 2011/0300929 | A1* | 12/2011 | Tardif | A63F 13/213 |
| | | | | 463/30 |
| 2012/0075428 | A1* | 3/2012 | Seki | H04N 13/0007 |
| | | | | 348/47 |
| 2012/0108328 | A1* | 5/2012 | Konno | H04N 13/398 |
| | | | | 463/31 |
| 2012/0218388 | A1 | 8/2012 | Kawakami | |
| 2012/0229628 | A1 | 9/2012 | Ishiyama | |
| 2012/0236125 | A1 | 9/2012 | Umezawa | |
| 2013/0010081 | A1* | 1/2013 | Tenney | A61B 34/30 |
| | | | | 348/47 |
| 2013/0063817 | A1* | 3/2013 | Santori | G02B 27/0172 |
| | | | | 359/471 |
| 2014/0118503 | A1* | 5/2014 | Luo | H04N 13/246 |
| | | | | 348/47 |
| 2016/0345000 | A1* | 11/2016 | Nishigaki | H04N 5/232 |
| 2017/0070731 | A1* | 3/2017 | Darling | H04N 17/002 |

FOREIGN PATENT DOCUMENTS

| | | | |
|---|---|---|---|
| JP | 2012175685 A | | 9/2012 |
| JP | 2014138331 A | | 7/2014 |
| JP | 2015001465 A | * | 1/2015 |
| JP | 2015001465 A | | 1/2015 |
| WO | 2011058876 A1 | | 5/2011 |

OTHER PUBLICATIONS

International Preliminary Report on Patentability and Written Opinion for corresponding PCT Application No. PCT/JP2016/064314, 11 pages, dated Nov. 30, 2017.

International Search Report for corresponding PCT Application No. PCT/JP2016/064314, 2 pages, dated Jul. 5, 2016.

Office Action for corresponding JP Application No. 2015-103183, 7 pages, dated Nov. 28, 2017.

Extended European Search Report for EP Application No. 16796424.6, 10 pages, dated Dec. 17, 2018.

* cited by examiner

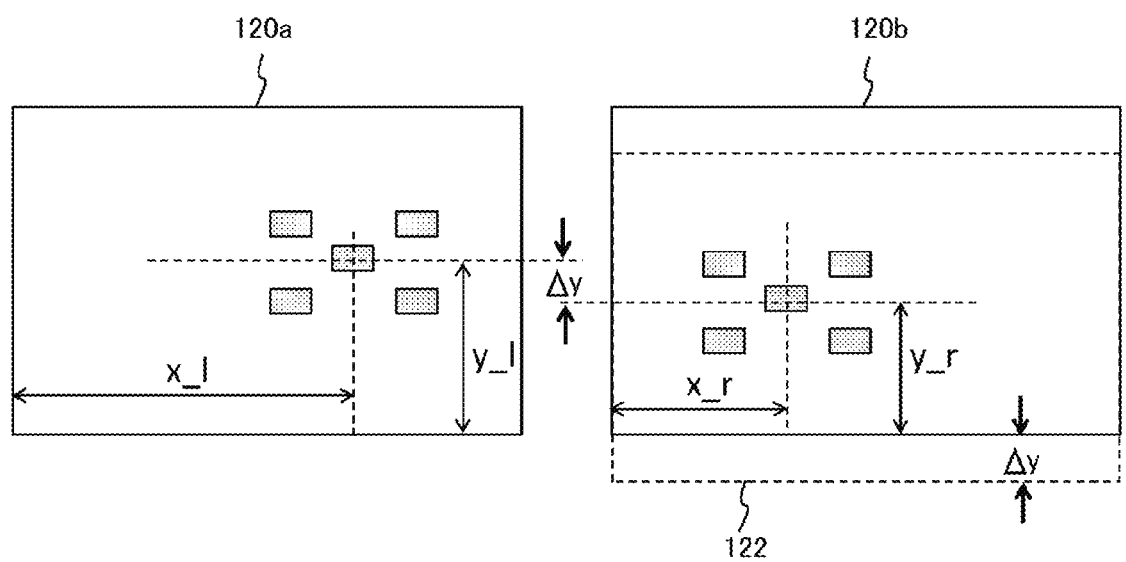
F I G. 5

INFORMATION PROCESSING DEVICE AND INFORMATION PROCESSING METHOD FOR STEREOSCOPIC IMAGE CALIBRATION

TECHNICAL FIELD

The present invention relates to information processing technology for detecting a target object from captured images.

BACKGROUND ART

Some video games involve capturing an image of a user's body and markers with a camera and having relevant regions of the captured image replaced with another image for display on a display device (refer to PTL 1, for example). Also known are user interface systems by which the movements of the mouth and hands captured with a camera are interpreted as instructions to operate an application. Such technology for capturing the real world in order to display a virtual world reacting to imaged movements in the real world or to perform some kind of information processing on the images has been used in diverse fields ranging from mobile terminals to leisure facilities regardless of the scale.

CITATION LIST

Patent Literature

[PTL 1] European Patent Application Publication No. 0999518

SUMMARY

Technical Problem

The above-outlined technology always faces the important challenge of how to accurately acquire information about the real world from acquired images. For example, if various imaging parameters are altered because of changes in the imaging environment or due to secular changes of an imaging device, there is a possibility that the accuracy of information acquisition may be reduced. However, the changes of such internal parameters are generally invisible and are difficult for any user to recognize. As a result, the user may keep using the device while complaining about a drop in the performance of the device. Optimal conditions could conceivably be obtained if the user were prompted to perform calibration periodically, e.g., every time processing is started. However, this is bound to increase the burden of the user.

The present invention has been made in view of the above circumstances. An object of the invention is therefore to provide technology for easily maintaining the accuracy of information processing that involves tracking a target object using acquired images with a minimum of time and effort on the user's part.

Solution to Problem

One embodiment of the present invention relates to an information processing device. This is an information processing device configured to acquire position information about a target object from images acquired by a stereo camera for information processing. The information processing device includes a target object detecting section configured to detect images of the target object from stereoscopic images acquired by the stereo camera from right and left points of view, a calibration determining section configured such that based on the result of detection of the target object images, the calibration determining section monitors an amount of vertical position misalignment between the stereoscopic images and determines that camera calibration is needed if the position misalignment amount meets a predetermined condition, and an output data generating section configured such that if the camera calibration is determined to be needed, the output data generating section outputs information about the determined need.

Another embodiment of the present invention relates to an information processing method. This is an information processing method performed by an information processing device configured to acquire position information about a target object from images acquired by a stereo camera for information processing. The information processing method includes a step of detecting images of the target object from stereoscopic images acquired by the stereo camera from right and left points of view, a step of monitoring, based on the result of detection of the target object images, an amount of vertical position misalignment between the stereoscopic images and determining that camera calibration is needed if the position misalignment amount meets a predetermined condition, and a step of outputting, if the camera calibration is determined to be needed, information about the determined need.

If other combinations of the above-outlined composing elements or the above expressions of the present invention are converted between different forms such as a method, a device, a system, a computer program, and a recording medium recording such a computer program, they still constitute effective embodiments of the present invention.

ADVANTAGEOUS EFFECTS OF INVENTION

According to the present invention, it is easy to maintain the accuracy of information processing using acquired images.

BRIEF DESCRIPTION OF DRAWINGS

FIG. 5 is a schematic view depicting stereoscopic images applicable when the optical axes or the vertical positions of a right camera and a left camera are not aligned with each other.

DESCRIPTION OF EMBODIMENTS

Figure 1:
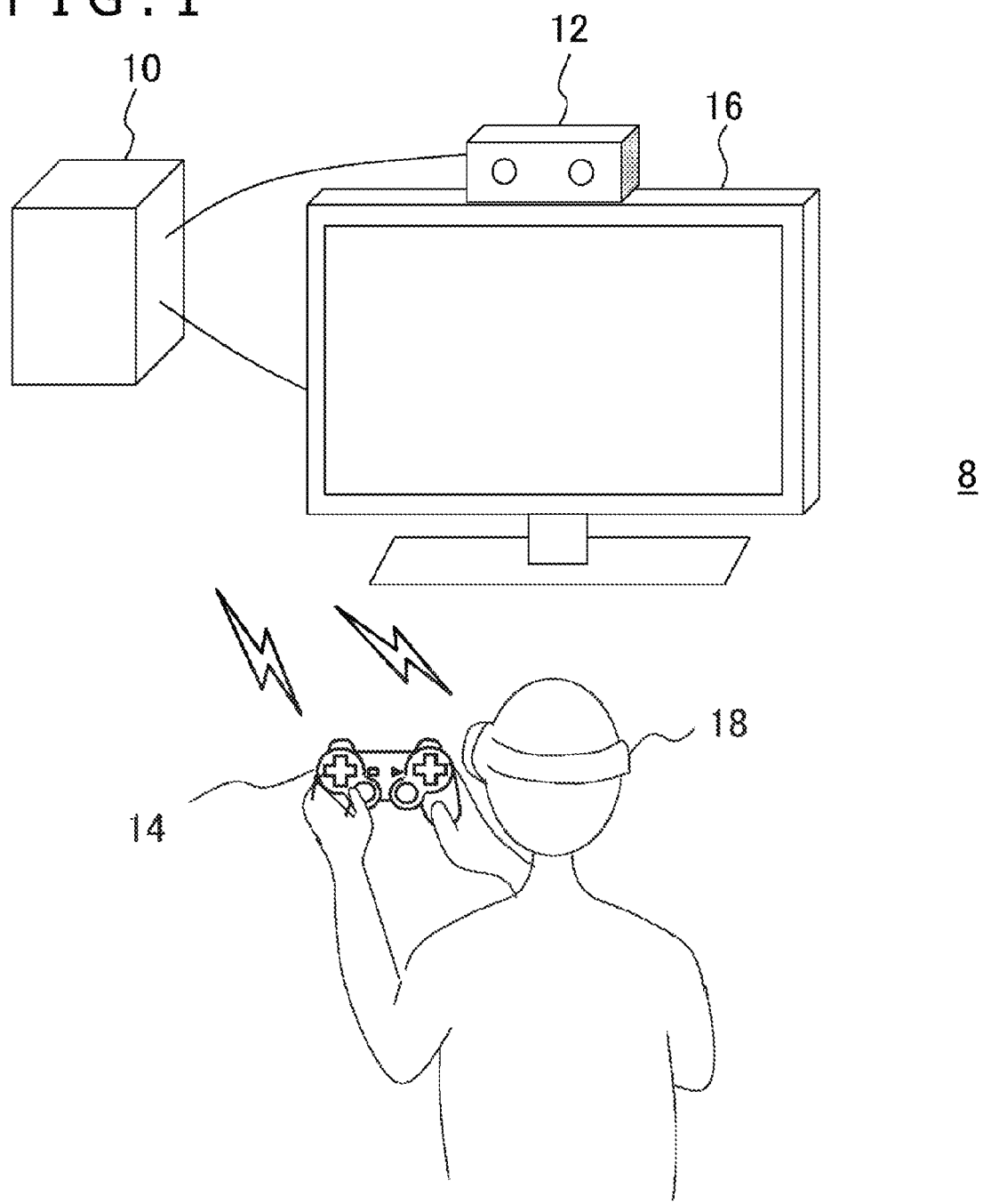
FIG. 1 is a schematic diagram depicting an exemplary configuration of an information processing system to which the present embodiment can be applied.

FIG. 1 is a schematic diagram depicting an exemplary configuration of an information processing system to which the present embodiment can be applied. An information processing system 8 includes an imaging device 12 that captures a figure of a target object, an information processing device 10 that performs information processing based on the captured image, a flat display 16 and a head-mounted display (called the HMD hereunder) 18 displaying images obtained as a result of the information processing, and an input device 14 operated by a user.

The information processing device 10, imaging device 12, input device 14, flat display 16, and HMD 18 may be interconnected by cable or in wireless fashion involving known wireless communication technology such as Bluetooth (registered trademark). Depending on the information processing performed by the information processing device 10, the input device 14, flat display 16, and HMD 18 may be provided selectively. The external shapes of these devices are not limited to what is illustrated in the drawing. Two or more of these devices may be provided integrally in a single device. For example, the information processing device 10, input device 14, and flat display 16 may be implemented integrally in a mobile terminal.

The imaging device 12 has a camera that acquires images of the target object such as the user at a predetermined frame rate, and a mechanism that performs known processes such as demosaicing on output signals from the camera to generate output data of the acquired images before transmitting the generated output data to the information processing device 10. The camera is a stereo camera that has a right and a left visible light sensor such as charge-coupled device (CCD) sensors or complementary metal oxide semiconductor (CMOS) sensors, the two devices being spaced a known horizontal distance apart.

The information processing device 10 generates the output data such as images and sounds by performing necessary information processing using data transmitted from the imaging device 12. The content of the processing performed by the information processing device 10 is not limited and may be determined appropriately in keeping with the functions desired by the user or the content of the application in use. For example, the information processing may involve performing a tracking process on acquired images to let a game progress in which appears a character reflecting the movement of the user as the target object, or converting the user's movement into input commands.

At this point, the movement of the input device 14 may be acquired using a marker attached thereto. As another alternative, multiple markers attached to an external surface of the HMD 18 may be tracked to identify the position and posture of the user's head wearing the HMD 18. The HMD 18 may then be caused to display a virtual world viewed from a point of view that moves in accordance with the identified position and posture of the user's head. The output data generated by the information processing device 10 is transmitted to at least the HMD 18 or the flat display 16.

The HMD 18 is a display device which, worn by the user on the head, displays images on a display panel, such as an organic electroluminescent (EL) panel, positioned in front of the user's eyes. For example, the HMD 18 generates parallax images viewed from the left and right and displays each image on the left and right screen regions making up the display screen, thus allowing the user to view a three-dimensional (3D) image. Alternatively, a single image may be displayed on the entire display screen. The HMD 18 may further incorporate speakers or earphones that output sounds to where the user's ears are located.

The flat display 16 may be a television (TV) set that has a display for outputting two-dimensional images and speakers for outputting sounds. For example, the flat display 16 may be a liquid crystal display TV set, an organic EL TV set, a plasma display TV set, or a personal computer (PC) display. In another example, the flat display 16 may be the display of a tablet terminal or a mobile terminal with speakers. The input device 14, when operated by the user, receives requests such as those for starting and ending processes, selecting functions, and inputting commands, and outputs the received request to the information processing device 10 as an electrical signal.

The input device 14 may be any one of common input devices such as a game controller, a keyboard, a mouse, a joystick, and a touch pad mounted on the display surface of the flat display 16, or a combination of these devices. The input device 14 may further include a light-emitting marker having an element emitting light in a predetermined color, or an aggregate of such light-emitting elements. In this case, the information processing device 10 may track the movement of the marker using captured images and interpret the movement of the input device 14 as the user's operation. As another alternative, the input device 14 may be composed of only a light-emitting marker and a mechanism for holding that marker.

Figure 2:
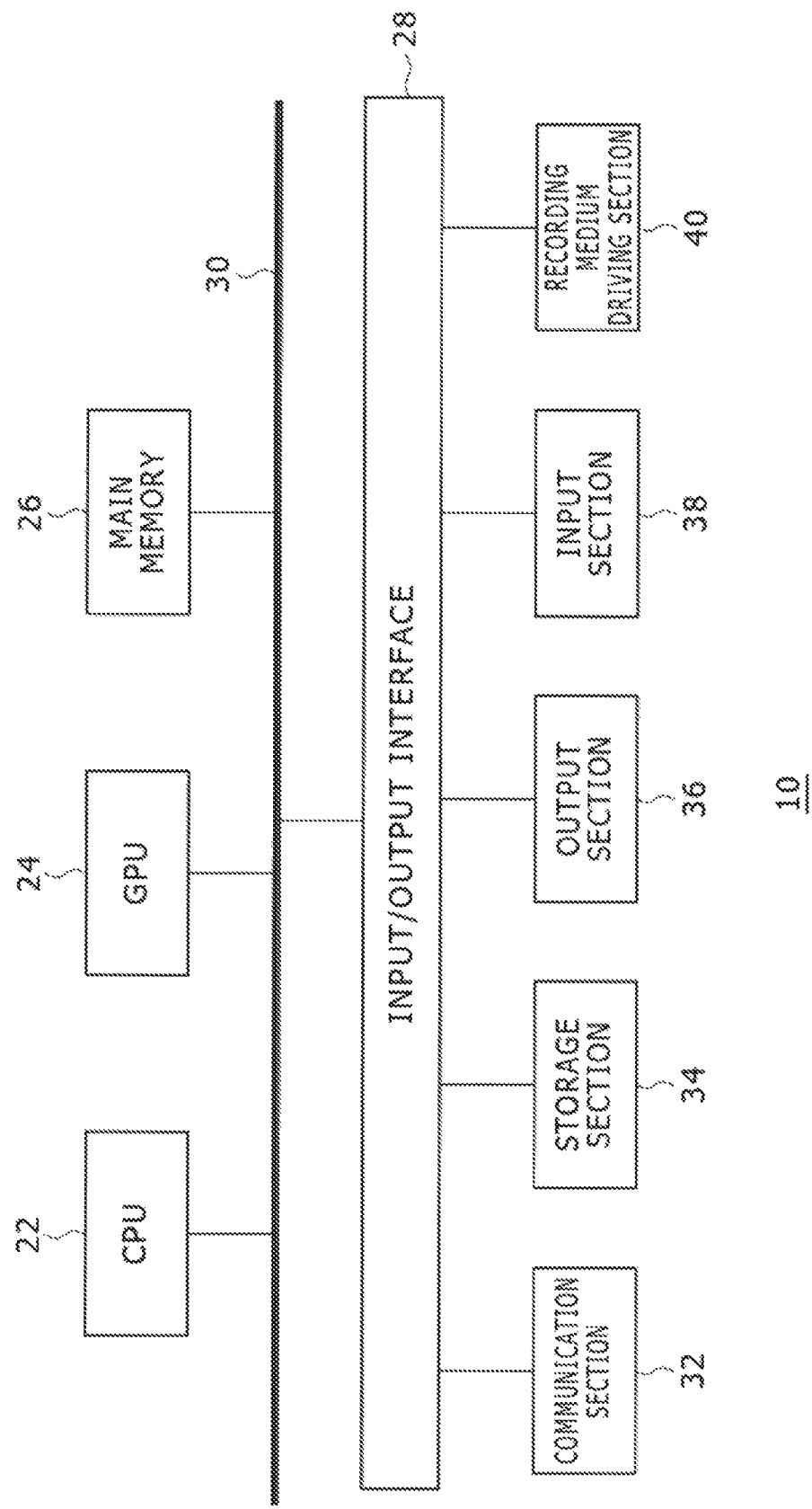
FIG. 2 is a schematic diagram depicting an internal circuit structure of an information processing device of the present embodiment.

FIG. 2 depicts an internal circuit structure of the information processing device 10. The information processing device 10 includes a central processing unit (CPU) 22, a graphics processing unit (GPU) 24, and a main memory 26. These components are interconnected via a bus 30. The bus 30 is also connected to an input/output interface 28. The input/output interface 28 is connected to peripheral device interfaces, such as a Universal Serial Bus (USB) interface and an Institute of Electrical and Electronics Engineers (IEEE) 1394 interface; a communication section 32 made of a wired or wireless local area network (LAN) interface; a storage section 34, such as a hard disk drive or a nonvolatile memory; an output section 36 for outputting data to the flat display 16 and HMD 18; an input section 38 for inputting data from the imaging device 12 or input device 14; and a recording medium driving section 40 that drives removable recording media, such as magnetic disks, optical disks, or semiconductor memories.

The CPU 22 controls the entire information processing device 10 by executing the operating system stored in the storage section 34. The CPU 22 also executes various programs read from the removable recording medium and loaded into the main memory 26 or programs downloaded via the communication section 32. The GPU 24 has the function of a geometry engine and that of a rendering processor. In accordance with a rendering instruction from the CPU 22, the GPU 24 performs a rendering process and stores the resulting display image in a frame buffer (not depicted). The GPU 24 proceeds to convert the display image in the frame buffer into a video signal and output the video signal to the output section 36. The main memory 26 is composed of a random access memory (RAM) that stores the programs and data necessary for the processing.

Figure 3:
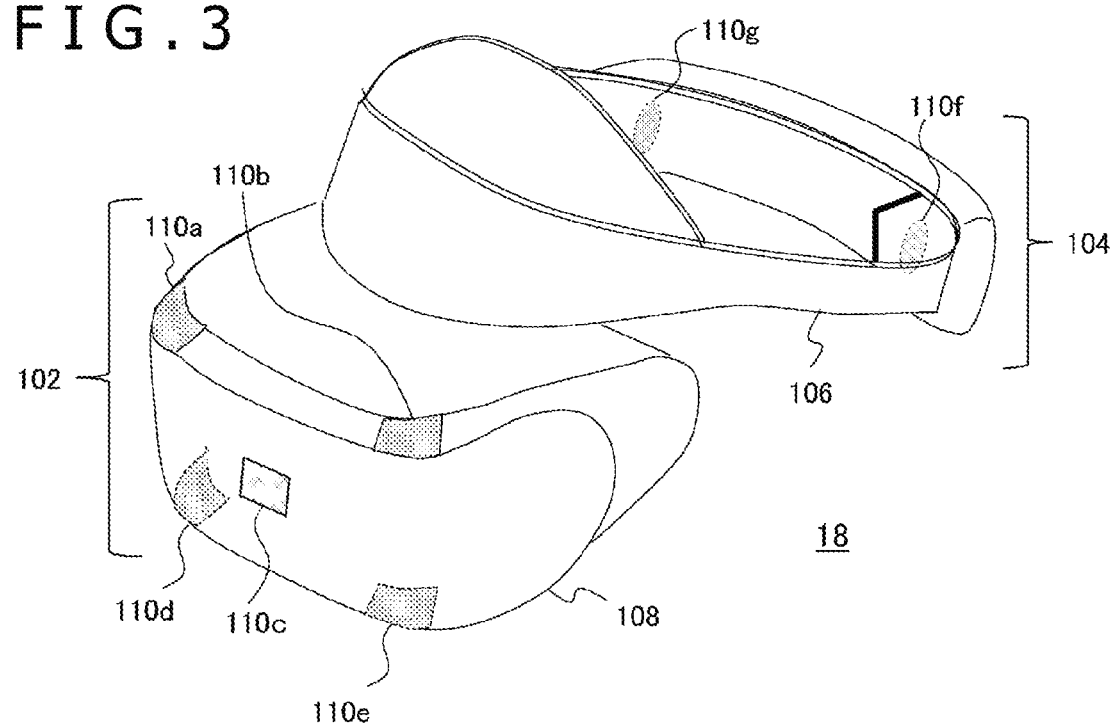
FIG. 3 is a schematic diagram depicting an external shape of a head-mounted display (HMD) of the present embodiment.

FIG. 3 depicts the external shape of the HMD 18. In this example, the HMD 18 includes an output mechanism section 102 and a wearing mechanism section 104. The wearing mechanism section 104 includes a wear band 106 worn by the user around the head to secure the device. The wear band 106 is made of a material adjustable in length to the circumference of the user's head or has such a structure. For example, the wear band 106 may be formed by an elastic body such as rubber or may employ a buckle or gear arrangement.

The output mechanism section 102 includes an enclosure 108 shaped to cover the user's left and right eyes when the HMD 18 is worn by the user. Inside the enclosure 108 is a display panel facing both eyes when the device is worn. Outside the enclosure 108 are light-emitting markers 110a, 110b, 110c, 110d, and 110e and the like. Although the number of light-emitting markers and their locations are not limited, the light-emitting markers are arranged at the four corners and the center of the enclosure front of the output mechanism section 102 in the present embodiment. Light-emitting markers 110f and 110g may be also arranged on both sides at the back of the wear band 106. The light-emitting markers 110d and 110e under the output mechanism section 102 and the light-emitting markers 110f and 110g outside the wear band 106 are not seen from the view of FIG. 3 and are thus indicated with broken lines depicting the circumferences of each marker.

Primarily, the information processing device 10 of the present embodiment detects images of light-emitting markers attached to the target object such as the HMD 18 from acquired images and, based on the detected light-emitting marker images, acquires the position and posture of the target object. In this manner, as described above, the information processing device 10 acquires the position and posture of the user itself and performs information processing in accordance with the movement and position of the user, such as causing the HMD 18 to display a virtual world from a point of view that follows the acquired position and posture of the user. It is to be noted that the light-emitting markers need not be those attached to the HMD 18; they may be attached to the input device 14 or may be carried directly by the user's body.

That is, the light-emitting markers need only be attached to the target object to be tracked in a manner conforming to the content of information processing. If the position and posture of the person's head are not tracked using the HMD 18, the display device is not limited to the HMD 18. The markers need not be of light-emitting type as long as they are each a distinguishable object or have a distinguishable shape among other objects or shapes in the imaging space.

Figure 4:
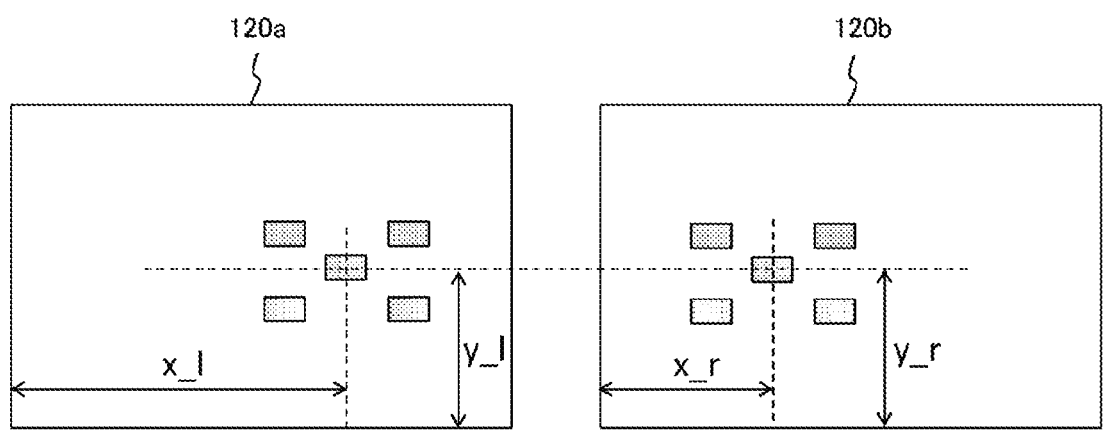
FIG. 4 is a schematic view explanatory of a technique for tracking the target object using images acquired by an imaging device of the present embodiment.

FIG. 4 is a schematic view explanatory of a technique for tracking the target object using images acquired by the imaging device 12. As described above, the imaging device 12 is configured as a stereo camera that has two cameras spaced a known horizontal distance apart. A pair of images (stereoscopic images) acquired by the stereo camera from right and left points of view have a horizontal parallax therebetween depending on the camera-to-camera spacing and on the distance of the camera from the target object. In FIG. 4, a stereoscopic image 120a from the left point of view shows, to the right, five hatched marker images typically from the HMD 18 in FIG. 3. Also in FIG. 4, a stereoscopic image 120b from the right point of view shows another five hatched marker images to the left.

These images are detected on the basis of their color, shape, and arrangement, for example. The difference in horizontal position coordinates between corresponding marker images in both stereoscopic images (e.g., x_l-x_r) is then obtained. The difference may be used as the basis for acquiring the distance from the imaging plane to the marker of interest. The technique for calculating the distance from the imaging plane on the basis of the difference in horizontal position between stereoscopic images is a common technique based on the principle of triangulation. When the position coordinates of a given marker on the image plane are inversely projected onto a real space on the basis of the calculated distance, not only the position of the maker in the real space but also the position of the target object can be identified.

If the optical axes of the two cameras constituting the imaging device 12 are parallel to each other and aligned vertically with each other, the vertical positions of the same marker image in the stereoscopic images 120a and 120b (e.g., y_l and y_r) coincide with each other. As long as the vertical positions align with each other, it is easy to identify the corresponding marker images in the stereoscopic images. In practice, however, there can be a slight misalignment of the optical axes depending on the degree of accuracy of assembly during manufacturing, for example.

FIG. 5 is a schematic view depicting stereoscopic images applicable when the optical axes (especially the pitch angle) or the vertical positions of the right and left cameras are not aligned with each other. In this example, the vertical position (e.g., y_l) of a given marker image in the image 120a from the left point of view is higher by Δy than the vertical position (e.g., y_r) of the corresponding marker image in the image 120b from the right point of view. In this state, if the principle that the corresponding marker images must be in the same row in both stereoscopic images is strictly adhered to, a misalignment Δy of only approximately ten pixels can cause the image correspondence to be falsely recognized. This makes it difficult to acquire an accurate parallax, resulting in a possible failure to obtain sufficient accuracy in tracking the target object.

In view of this, the individual imaging devices 12 are checked for status at the manufacturing stage. A parameter representing the vertical misalignment Δy is then recorded to a nonvolatile memory, for example. At the time of operation, the information processing device 10 retrieves the parameter so as to vertically shift by Δy, on a virtual image plane, one of the stereoscopic images acquired by the imaging device 12 to align the vertical positions of these images. In the example of FIG. 5, a corrected image 122 framed by dotted lines is generated by shifting up by Δy the image 120b from the right point of view.

A comparison between the image 120a from the left point of view and the corrected image 122 permits easy identification of the corresponding marker images based on their vertical positions. However, after being shipped, the imaging device 12 can incur varying in position misalignment Δy resulting from diverse causes including internally generated heat during operation, externally applied impact such as a fall, and secular changes in components. Thus in order to maintain the accuracy of processing, it is preferred that users perform their own calibrations to update the settings of position misalignment Δy.

The preferred timing for calibration varies depending typically on usages and cannot be determined categorically. It is also difficult for the user to recognize the need for calibration. Preferably, calibration is performed in an appreciably rigorous manner to permit rapid and highly accurate tracking with simple procedures during operation. For example, the position misalignment Δy is desired to be acquired by performing block matching over the entire screen to acquire corresponding points therefrom and by consolidating detailed matching processes involved. Preferably, the accuracy of calibration is further improved using images acquired under conditions and an environment suitable for such block matching.

If it is regulated that the calibration process be carried out with high frequency, the user can be stressed because the information processing device 10 is not usable during calibration or because more time and effort are needed to provide a suitable imaging environment. If calibration is not performed with a view to minimizing the user's stress, the accuracy of the tracking process may deteriorate and the output result may be adversely affected. That in turn may cause the performance of the device or that of the application in use to be rated lower than normal. In the present embodiment, by contrast, the information processing device 10 determines the timing necessary for calibration so that the accuracy of tracking will be maintained with a minimum of time and effort.

Figure 6:
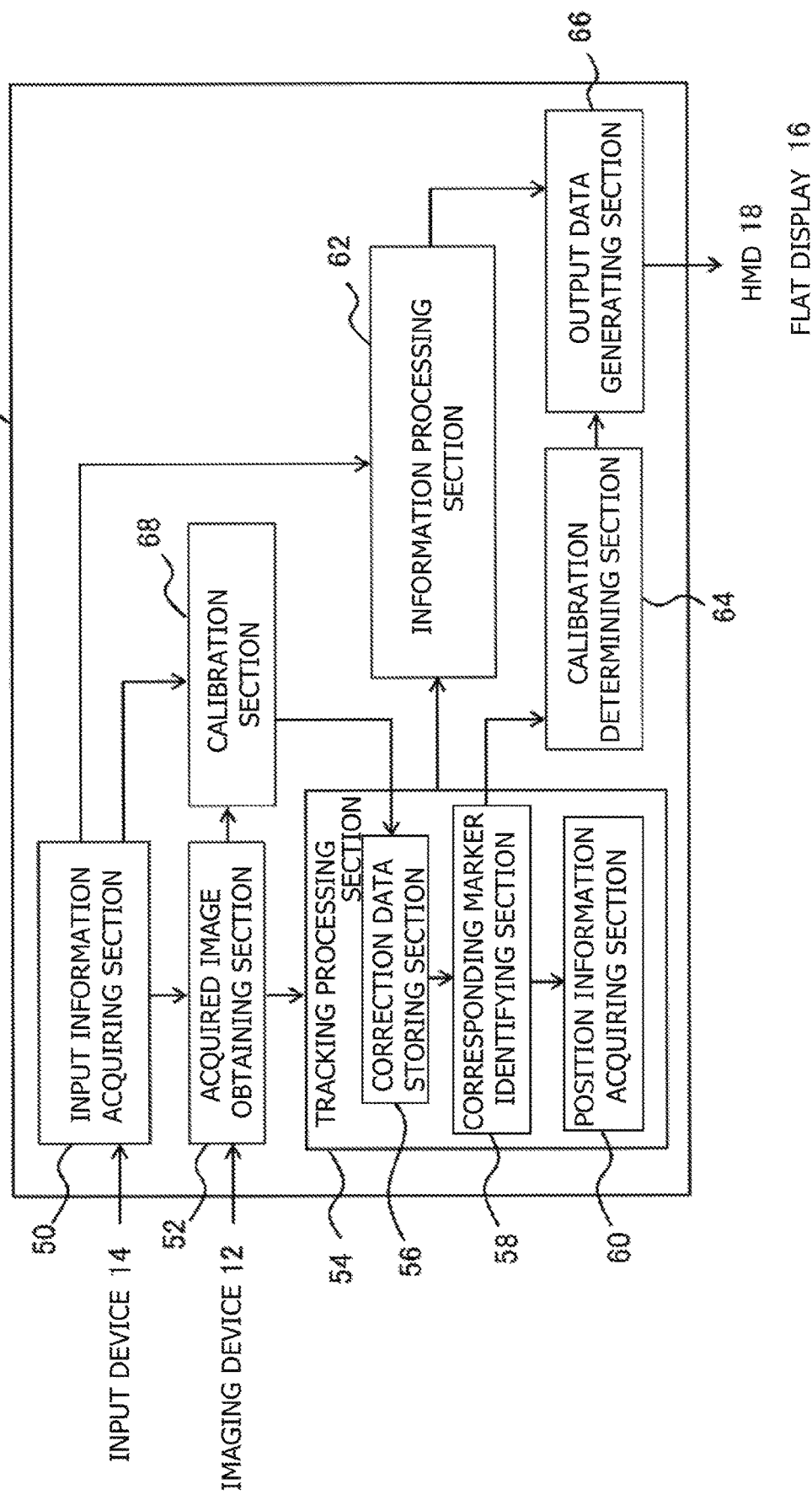
FIG. 6 is a block diagram depicting a structure of functional blocks of the information processing device of the present embodiment.

FIG. 6 is a block diagram depicting a structure of functional blocks of the information processing device 10. The functional blocks depicted in FIG. 6 may be configured by hardware using, for example, the CPU, GPU, and memory depicted in FIG. 2, or by software using programs that are loaded from suitable recording media into memory and executed to implement diverse functions including a data input function, a data holding function, an image processing function, and an input/output function. It will be appreciated by those skilled in the art that these functional blocks are configured by hardware only, by software only, or by a combination thereof in diverse forms and are not limited to any one of such forms.

The information processing device 10 includes an input information acquiring section 50 that acquires input information from the input device 14, an acquired image obtaining section 52 that obtains the data of acquired images from the imaging device 12, a tracking processing section 54 that keeps track of the target object based on marker images, an information processing section 62 that performs information processing using the result of tracking for example, an output data generating section 66 that generates output data such as display images as a result of information processing, a calibration determining section 64 that determines the timing necessary for calibration in parallel with the tracking process, and a calibration section 68 that performs calibration.

The input information acquiring section 50 acquires the content of user operations from the input device 14. The user operations may be those carried out in connection with general information processing, such as selection of the application to be executed, a start and an end of processing, and input of commands. The input information acquiring section 50 supplies the information acquired from the input device 14 selectively to the acquired image obtaining section 52, information processing section 62, or calibration section 68 in accordance with the content of the acquired information.

The acquired image obtaining section 52 obtains at a predetermined frame rate the data of a moving image acquired by the imaging device 12. The acquired image obtaining section 52 may further control the start and/or the end of imaging by the imaging device 12 in keeping with the user's request to start and/or to end processing acquired by the input information acquiring section 50. Also, the acquired image obtaining section 52 may control the type of data to be acquired from the imaging device 12 in accordance with the result of processing by the information processing section 62.

The tracking processing section 54 tracks the target object such as the HMD 18 based on acquired images, thereby identifying the movement and position of the target object. More specifically, the tracking processing section 54 includes a corresponding marker identifying section 58, a position information acquiring section 60, and a correction data storing section 56. The corresponding marker identifying section 58 acquires from the acquired image obtaining section 52 the data of moving stereoscopic images in units of frames to detect corresponding marker images from the two stereoscopic images. The corresponding marker identifying section 58 proceeds to associate the position coordinates of the detected marker images, before supplying the corresponding position coordinates to the position information acquiring section 60 and calibration determining section 64.

In this context, the "position coordinates" refer to those of a given position such as the center of gravity in a limited area of marker images. The correction data storing section 56 is a storage region that stores the data representative of the vertical misalignment Δy between stereoscopic images. In the initial state, the misalignment data was acquired typically at the time of shipment from the factory. The corresponding marker identifying section 58 retrieves the stored data and vertically shifts one of two stereoscopic images based on the position misalignment Δy represented by the data, on an image plane, to align the vertical positions of both stereoscopic images, thereby identifying the corresponding marker images.

Given the difference in horizontal position between corresponding marker images in stereoscopic images, the position information acquiring section 60 identifies not only the position of the marker of interest but also the position of the target object bearing the marker based on the principle of triangulation. Preferably, multiple markers may be adopted. In such a case, the positional relations between the markers may be used as a basis for identifying the posture of the target object. For example, a 3D model of the target object may be prepared, with apparent positions of the markers input to the 3D model to obtain the posture of the target object.

As another alternative, measured values may be acquired from various sensors including an acceleration sensor attached to the target object, the values being integrated with the position information obtained from acquired images to permit more detailed identification of the posture of the target object, for example. The position information acquiring section 60 supplies the information processing section 62 with information about the acquired position and posture of the target object. The information processing section 62 performs information processing of a user-designated game, for example. In this case, the information processing section 62 acquires from the tracking processing section 54 the result of tracking of the target object on a frame-by-frame basis so that the movement of the target object may be reflected in the information processing. The content of the user operations acquired by the input information acquiring section 50 from the input device 14 may also be reflected in the information processing. As described above, the content of information processing performed by the information processing section 62 using the input data is not limited to anything specific.

The calibration determining section 64 determines the timing necessary for calibration based on the difference in vertical position coordinates between corresponding marker images sent from the corresponding marker identifying section 58 in the tracking processing section 54. Specifically, with stereoscopic images vertically aligned based on the vertical position misalignment Δy set in the correction data storing section 56, the calibration determining section 64 monitors whether the marker images vertically align with each other in the aligned stereoscopic images. If the observed misalignment exceeds a threshold value, the calibration determining section 64 determines that the settings of the position misalignment Δy need to be updated. The determining process will be discussed later in more detail.

In response to a request from the information processing section 62, the output data generating section 66 generates the data of images and sounds to be output as the result of information processing. For example, the output data generating section 66 renders, in the form of right and left parallax images, a virtual world as seen from the point of view reflecting the position and posture of the user's head as mentioned above. The user can experience the sensation of actually being in the virtual world when presented with the parallax images on the HMD 18 in front of both eyes and with the sounds from the virtual world. It will also be appreciated by those skilled in the art that diverse types of information processing are implemented using the result of tracking and the user's operations.

When the calibration determining section 64 determines that calibration is needed, the output data generating section 66 generates a display image for notifying the user of the determined need. The generated output data is sent as needed to the HMD 18 and flat display 16 for output thereby in the form of images and sounds.

The calibration section 68 performs a predetermined calibration process to update the data representative of the position misalignment Δy stored in the correction data storing section 56. Basically, the user notified of the need for calibration gets the calibration section 68 started by means of the input device 14. In response, the calibration section 68 typically extracts corresponding points from stereoscopic images by scanning these images entirely in units of pixels or sub-pixels. The calibration section 68 may then compare the position coordinates of the extracted points to acquire the position misalignment Δy with precision.

That is, the calibration section 68 acquires more detailed information at this point than in the process performed by the tracking processing section 54 detecting marker images to track the target object during information processing of a game, for example. It is therefore to be noted that the imaging environment such as the brightness and the target object, imaging conditions such as exposure time, and image processing conditions such as gains are often different from those applicable during information processing such as that of a game. Preferably, the user may be prompted, using suitable display, to prepare an optimal imaging environment. Although the environment and the processing conditions required for calibration may differ from those of ordinary processing such as that of a game, the present embodiment minimizes the frequency of such calibration by letting the device determine the calibration timing so that the accuracy of information processing may be maintained with a minimum of burdens on the user.

Figure 7:
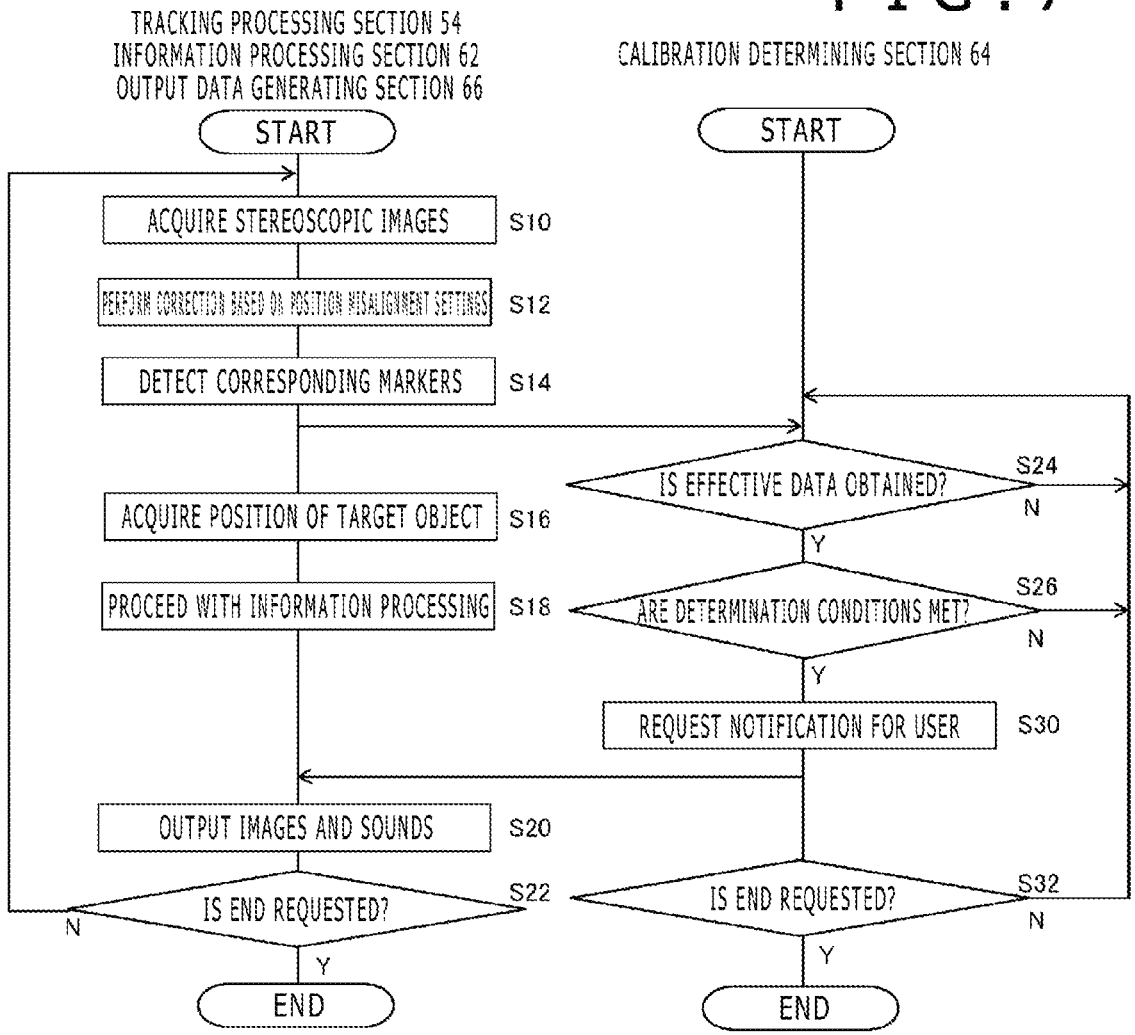
FIG. 7 is a flowchart depicting procedures in which the information processing device of the present embodiment determines the timing necessary for calibration while carrying out information processing.

Described below are typical operations of the information processing device 10 that may be implemented with the above configuration. FIG. 7 is a flowchart depicting procedures in which the information processing device 10 of the present embodiment determines the timing necessary for calibration while carrying out information processing of a game, for example. In the flowchart, the left flow represents a procedure in which the tracking processing section 54, information processing section 62, and output data generating section 66 perform primary information processing such as processing of the game. The right flow denotes a procedure in which the calibration determining section 64 determines the timing necessary for calibration, the procedure being executed in parallel with the former procedure. The latter procedure is carried out in the background, i.e., in such a manner that the user remains unaware of its performance while the primary information processing such as game execution is underway.

First, the user inputs a processing start request using the input device 14 to select a game, for example. In turn, the acquired image obtaining section 52 requests the imaging device 12 to start imaging. The tracking processing section 54 acquires stereoscopic image data transmitted in response to the request (S10). The corresponding marker identifying section 58 in the tracking processing section 54 performs correction to align the vertical positions of the acquired stereoscopic images based on the data representing the vertical misalignment Δy stored in the correction data storing section 56 (S12). Then the corresponding marker identifying section 58 detects corresponding marker images from both stereoscopic images (S14).

The correction places the corresponding marker images in a limited vertical range, making it easy to have the two images correspond to each other. The corresponding marker identifying section 58 offers the position coordinates of the corresponding marker images to the position information acquiring section 60 in the tracking processing section 54 and the calibration determining section 64. The position information acquiring section 60 calculates the distance between the imaging plane and the marker of interest from the difference in horizontal position between the corresponding marker images, thereby acquiring information about the position and posture of the target object (S16).

Given the information thus acquired, the information processing section 62 proceeds with information processing of the game, for example (S18). The information processing section 62 causes the output data generating section 66 to generate output data such as images and allows the data to be output typically from the HMD 18 (S20). Meanwhile, the calibration determining section 64 acquires the position coordinates of the corresponding marker images from the corresponding marker identifying section 58. The calibration determining section 64 then determines whether or not effective position data for determining the need for calibration is obtained (S24). The "effective position data" in this context refers to the position data that is sufficiently reliable for determining the need for calibration.

Qualitatively, the calibration determining section 64 determines that there is a need for calibration if the vertical position misalignment between corresponding marker images in stereoscopic images exceeds a predetermined threshold value. However, if the determining process is performed using the marker position coordinates detected from stereoscopic images of only a single frame, for example, a temporary error of position coordinates may trigger the determination that calibration is necessary when in fact there is no need for it. In order to avoid determining such unnecessary timing for calibration and minimize the burden of the user, it is preferable to scrutinize the effectiveness of the position data serving as the basis for the determination.

Specifically, whether the position data is effective is determined from two viewpoints, for example: (1) whether the target object is tracked accurately by the tracking processing section 54, and (2) whether a sufficient amount of position data has been collected. A specific example of the determination will be discussed later. As long as the effective data has yet to be obtained in S24, the process of acquiring position information about the corresponding markers and the determining process are repeated (N in S24). If it is determined that the effective position data is obtained (Y in S24), the vertical position misalignment indicated by the obtained data is compared with the threshold value. If the comparison reveals that the necessary conditions for calibration are met (Y in S26), the calibration determining section 64 requests the output data generating section 66 to notify the user to that effect (S30).

If the necessary conditions for calibration are not met, the current settings of the position misalignment $\Delta y$ are deemed acceptable, and the determining process in S24 is repeated until the effective data is again obtained (N in S26). If the request is made for the user to be notified of the need for calibration, the output data generating section 66 generates notification image data and causes the HMD 18 for example to output the generated data (S20). The above processing is repeated for each frame of the moving image acquired by the imaging device 12 (N in S22 and N in S32). If the user requests an end of the information processing by means of the input device 14 or if the ongoing game comes to an end, for example, the whole processing is terminated (Y in S22 and Y in S32).

Figure 8:
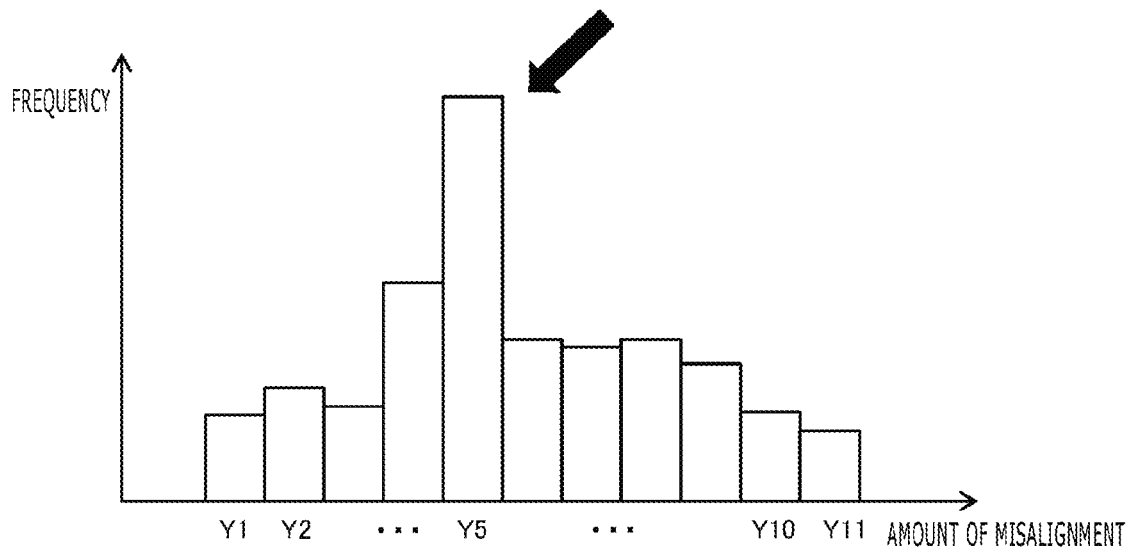
FIG. 8 is a graphic representation explanatory of a technique for determining whether or not effective position data is acquired with the present embodiment.

FIG. 8 is a graphic representation explanatory of a technique for determining whether or not effective position data is acquired in S24 of FIG. 7. In this example, the effectiveness of the data is verified using the vertical position misalignment amounts between corresponding marker images being accumulated over a predetermined time period. Specifically, every time the position coordinate data about corresponding marker images is supplied from the corresponding marker identifying section 58, the vertical difference between the marker images is regarded as a "misalignment amount." The frequency of each different misalignment amount is incremented. If five markers are captured from each stereoscopic image as depicted in FIG. 4, the frequency of one of the misalignment amounts is incremented for a total of five times per frame.

When the above process is repeated, a "frequency" histogram of "misalignment amounts" grows as depicted in FIG. 8. As indicated by an arrow in the drawing, an obviously dominant misalignment amount "Y5" among others in terms of frequency is used as the effective position data for determining the need for calibration. For example, the "dominant misalignment amount" is a misalignment amount of which the frequency has exceeded a predetermined threshold value for the first time, a misalignment amount of which the frequency is the highest upon elapse of a predetermined time period since the start of data accumulation, or a misalignment amount of which the frequency is the highest when the distribution of frequencies has ended. The dominant misalignment amount may be determined by statistical processing using standard deviations, for example.

Once the dominant misalignment amount is determined, the preceding histogram may be discarded, and the frequency may be incremented again from zero to generate the next histogram. Alternatively, the frequency of each misalignment amount in the preceding histogram may be multiplied by a predetermined rate of less than 1, before being incremented subsequently. This allows a certain portion of the preceding results to be reflected in the next histogram. As another alternative, the incremented frequency may be weighted by taking into consideration the circumstances in which the corresponding marker identifying section 58 obtained the marker position coordinates. For example, if marker images are small in acquired images, the position coordinates may likely contain an error due to a long distance from the imaging plane to the marker or because of the marker being partially outside the field of view.

Thus the frequency may be weighted in such a manner that the smaller the marker images, the smaller the frequency value is for each increment. If a light-emitting object other than the markers such as an illumination or a terminal display is found in the field of view, an image of such an object could be falsely recognized as a marker. Furthermore, if one target object has multiple markers as on the HMD 18 in FIG. 3, the number of imaged markers may be reduced depending on how the target object is oriented. The smaller the number of marker images, the smaller the amount of information represented by such markers becomes. This can lead to false recognition of the correspondence between markers.

In each of these cases, the frequency may also be weighted in such a manner that the frequency value for each increment is made smaller. Also, the incremented frequency may be weighted by taking into consideration any phenomenon that can affect the position coordinates of markers or the accuracy in identifying the correspondence between the markers. Such consideration contributes to generating a more accurate histogram and thereby improving the reliability of the misalignment amounts used for determining the need for calibration. In these cases, the corresponding marker identifying section 58 supplies the calibration determining section 64 with various data for use in the weighting process along with the position coordinate data.

Figure 9:
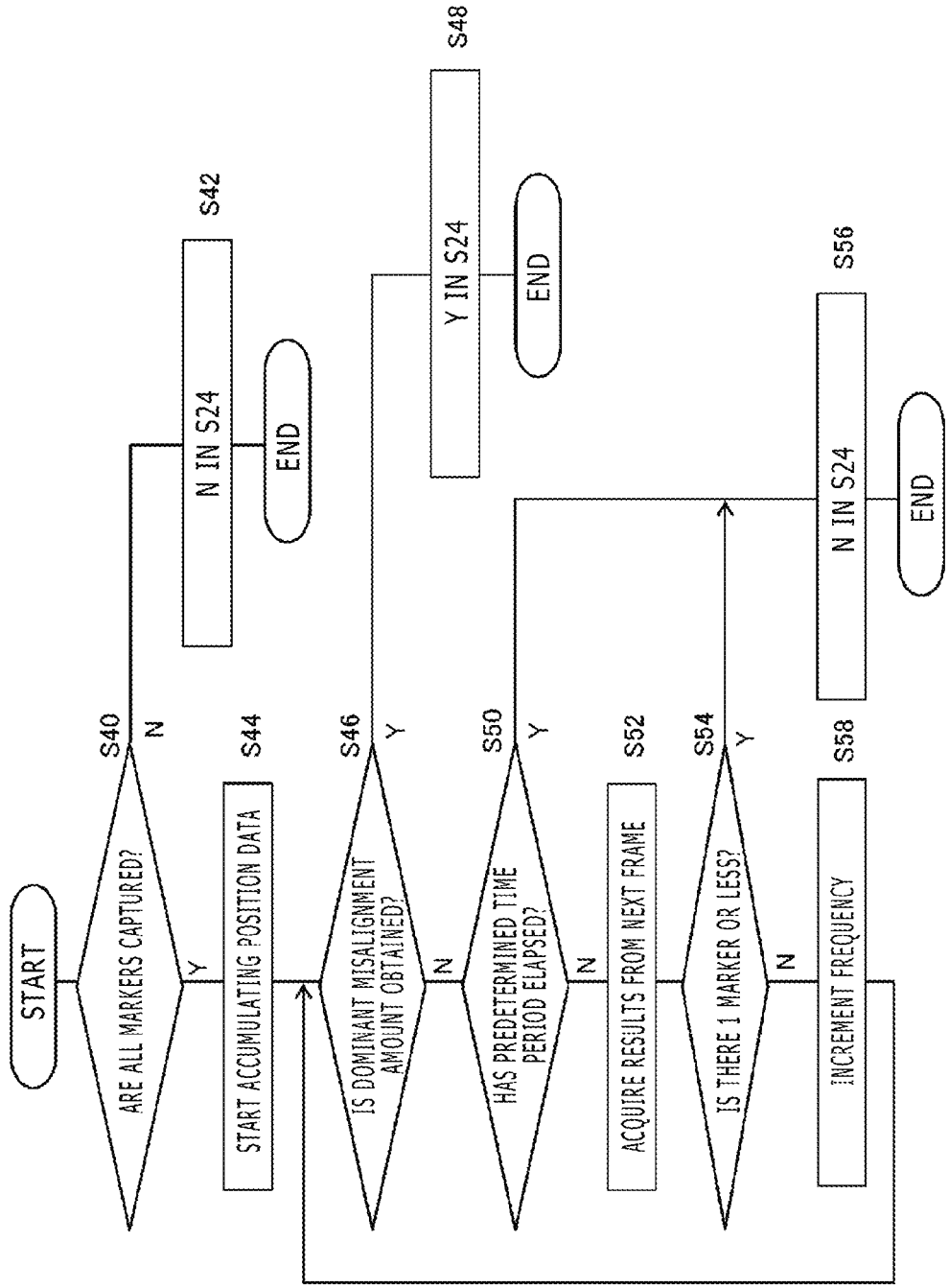
FIG. 9 is a flowchart depicting a procedure in which the present embodiment verifies the effectiveness of position data when determining a start and an end of data accumulation using the number of marker images detected from images.

Moreover, the circumstances in which the corresponding marker identifying section 58 acquired the marker position coordinates may be used in determining at least the timing to start or to end the generation of a histogram. FIG. 9 is a flowchart depicting a procedure for verifying the effectiveness of position data when the number of marker images in acquired images is utilized. The entire processing corresponds to S24 in FIG. 7. The initial state of the processing is before the accumulation of position coordinate data is started anew, such as just after the effective position data has been obtained. During this period, the calibration determining section 64 is assumed to have obtained from the corresponding marker identifying section 58 the information about the number of marker images in acquired images along with the position coordinate data.

If all markers on a single object, e.g., five markers on the HMD 18 in FIG. 3, are captured (Y in S40), the accumulation of position coordinate data is started (S44). The accumulation of position coordinate data typically translates into generation of the histogram such as one in FIG. 8. As described above, the larger the number of marker images, the lower the possibility of false recognition of correspondence by the corresponding marker identifying section 58. Where there are numerous marker images, the accumulation of coordinate data, once started, continues with the reliability of accumulated data kept more or less intact even if the number of marker images slightly drops due to the target object being turned in different directions during the subsequent data accumulation period.

On the other hand, if the number of marker images is smaller than the number of the markers attached to the target object (N in S40), it is determined that effective data is not obtained (N in S24 of FIG. 7) and the processing is exited (S42). In practice, this brings control back to the determination in S40 as indicated by the flowchart in FIG. 7. As long as the accumulated amount of data is not sufficient, a dominant misalignment amount is not obtained (N in S46). It is thus determined whether a predetermined time period has yet to elapse from the start of data accumulation (N in S50). The data such as position coordinates is then acquired from the next frame (S52).

If at least either of two stereoscopic images from the current frame has only one detected marker image or contains no marker image at all (Y in S54), it is determined that effective data is not obtained (N in S24 of FIG. 7) and the processing is exited (S56). That is, the accumulation of data is stopped and the histogram is discarded. If each of two stereoscopic images from the next frame has two or more detected marker images (N in S54), the frequency is incremented on the basis of the misalignment between the corresponding markers in this frame (S58).

If the predetermined time period has yet to elapse and as long as at least two marker images are detected, the frequency is incremented on the basis of the position coordinate data from subsequent frames (N in S46, N in S50, S52, N in S54, and S58). If the dominant misalignment amount is determined within the predetermined time period (Y in S46), it is determined that the effective data is obtained (Y in S24 of FIG. 7) and the processing is exited (S48). The misalignment amount obtained at this point is used for determining the need for calibration in S26 of FIG. 7. If the predetermined time period has elapsed before a dominant misalignment amount is acquired (N in S46 and Y in S50) or if the number of marker images is one or less (Y in S54), it is determined that the effective data is not obtained (N in S24 of FIG. 7) and the processing is exited (S56). That is, the accumulation of data is stopped and the histogram is discarded.

The number of marker images used for the determination in S40 or S54 is not limited to what is indicated in the drawings. The criterion for determining the start or the end of the accumulation of position coordinate data is not limited to the number of marker images. That criterion may be any one of the phenomena related to the accuracy in the position coordinate acquisition and discussed above in connection with the weighting of the frequency. As another alternative, the criterion for determining the start or the end of the position coordinate data accumulation may be whether or not the distance between the marker and the imaging plane is within a predetermined range, whether or not maker images are positioned within a predetermined range of the frame, whether or not any marker is occluded by some object in front of the marker, or whether or not light emission from any marker appears as glare on some other object.

The above-mentioned factors also affect the accuracy of the entire process of tracking the target object performed by the tracking processing section 54. For this reason, the calibration determining section 64 may acquire information related to tracking accuracy and tracking conditions from the tracking processing section 54 and determine accordingly the start or the end of the position coordinate data accumulation. Furthermore, the operation of the calibration determining section 64 may be stopped if it is determined that sufficient accuracy for the position misalignment amount acquisition is not available due to diverse factors related to the imaging space, such as the installation site of the imaging device 12, ambient brightness, or colors of lights found in the imaging space.

Figure 10:
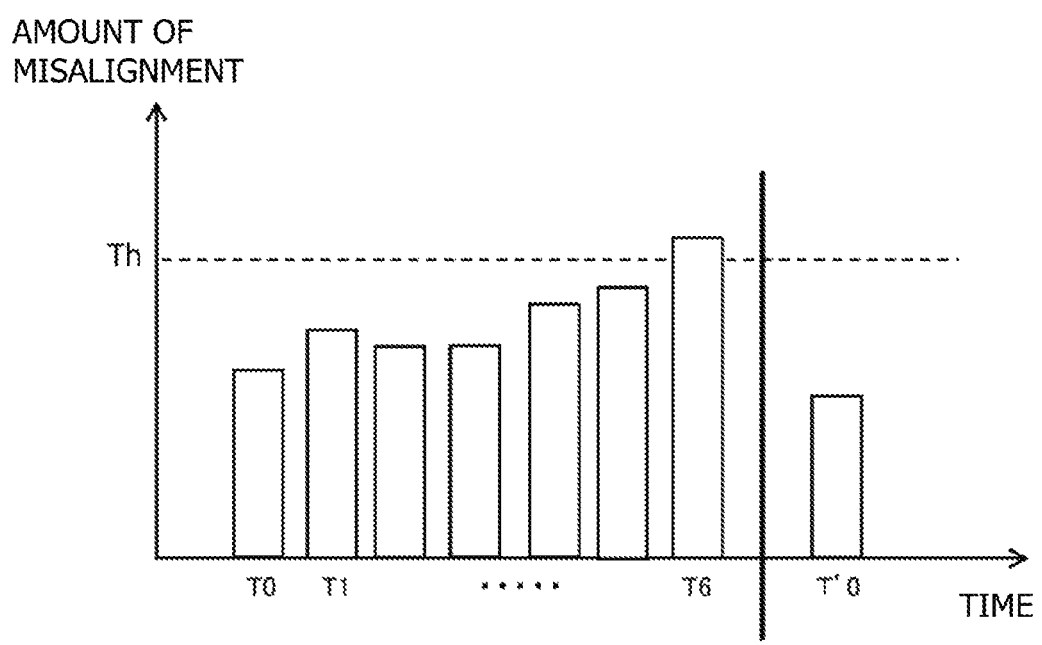
FIG. 10 is a graphic representation explanatory of relations between effective amounts of misalignment and the process of determining the need for calibration.

FIG. 10 is a graphic representation explanatory of relations between effective misalignment amounts obtained as discussed above on one hand and the process of determining the need for calibration on the other hand. The horizontal axis in the drawing denotes the elapse of time and the vertical axis represents misalignment amounts acquired at times T0, T1, etc., at which effective data is determined to be obtained in S24 of FIG. 7. Every time an effective misalignment amount is obtained, the calibration determining section 64 compares the amount with a predetermined threshold value Th. At time T6 at which the misalignment amount exceeds the threshold value, the calibration determining section 64 determines that calibration is needed and notifies the user of the determined need. The threshold value Th may be an optimal value acquired typically through prior experiments and held inside the information processing device 10 or may be the setting established in the application to be run and retrieved therefrom.

Given the notification, the user starts the function of the calibration section 68 in a suitably timed manner convenient for the user. In FIG. 10, the suitable timing is indicated by a thick line. The calibration section 68 acquires the vertical position misalignment $\Delta y$ precisely from stereoscopic images typically through block matching as described above, and rewrites the data representing the misalignment to the correction data storing section 56. This permits accurate position alignment of stereoscopic images next time the user starts a game or some other application causing the tracking processing section 54 to detect marker images in tracking the target object.

As a result, the effective misalignment amount acquired next at time T'0 by the calibration determining section 64 is equal to or below the threshold value Th, so that calibration is determined to be unnecessary. If the user were to decide against performing calibration despite being notified of the need for it at time T6, the misalignment amount keeps exceeding the threshold value Th. The notification thus continues. In this state, the user can nevertheless continue the information processing of the game, for example. If the result of the ongoing processing is affected in some way by the misalignment, the user can recognize the probable cause of it. This makes it possible for the user to avoid unfairly evaluating the information processing device or the application or feeling stressed.

According to the above-described embodiment, the information processing technology for tracking the target object using stereoscopic images involves monitoring the need for camera calibration through the use of vertical position misalignment amounts between marker images obtained while the tracking process is underway. If the need for calibration is detected, the user is notified of the detected need and prompted to carry out the calibration process. This prevents the deterioration of information processing performance attributable to factors not recognized easily by the user such as changes in stereo camera status, so that an optimal state for information processing is maintained with ease. Because the need for calibration is determined in the actual circumstances, calibration at unnecessary timing is avoided.

Since the frequency of calibration is reduced, the calibration process may be carried out rigorously with a minimum of trouble. As a result, the tracking process during operation is performed easily and highly accurately. Because parameters acquired during the tracking process in operation are utilized, there is no need for the user to start a separate function for determining the need for calibration or to prepare a specific imaging environment for the separate function. Constant monitoring is implemented with a minimum of burdens on the device. Because such steady monitoring is used to determine the need for calibration, the determining process is implemented in a highly accurate manner based on accumulated data. Furthermore, diverse parameters obtained from the tracking process are utilized in carrying out highly precise determination with a reduced load on the device.

While the present invention has been described in conjunction with a specific embodiment given as an example, it should be understood by those skilled in the art that the above-described composing elements and various processes may be combined in diverse ways and that such combinations, variations and modifications also fall within the scope of the present invention.

REFERENCE SIGNS LIST

8 Information processing system, 10 Information processing device, 12 Imaging device, 14 Input device, 16 Flat display, 18 HMD, 50 Input information acquiring section, 52 Acquired image obtaining section, 54 Tracking processing section, 56 Correction data storing section, 58 Corresponding marker identifying section, 60 Position information acquiring section, 62 Information processing section, 64 Calibration determining section, 66 Output data generating section, 68 Calibration section, 110a Light-emitting marker

INDUSTRIAL APPLICABILITY

As described above, the present invention is applicable to computers, display devices, game devices, information processing devices, and image processing devices for processing diverse kinds of electronic content, as well as to systems that include these devices.

The invention claimed is:

1. An information processing device configured to acquire position information about a target object from images acquired by a stereo camera for information processing, the information processing device comprising:
a target object detecting section configured to detect images of the target object from stereoscopic images acquired by the stereo camera from right and left points of view and acquire, based on a result of detection of the target object images, position information about the target object for use in the information processing;
a calibration determining section configured such that in parallel with the process of acquiring the position information by the target object detecting section and based on the result of detection of the target object images, the calibration determining section monitors an amount of vertical position misalignment between the stereoscopic images and determines that camera calibration is needed if the position misalignment amount meets a predetermined condition; and
an output data generating section configured such that if the camera calibration is determined to be needed, the output data generating section outputs information about the determined need,
wherein the calibration determining section cumulatively records amounts of vertical position misalignment between the stereoscopic images from a plurality of frames in a moving image acquired by the stereo camera over numerous calibration cycles, and determines an effective position misalignment amount for use in determining whether or not the camera calibration is needed on the basis of the accumulated vertical position misalignment amounts.

2. The information processing device according to claim 1, wherein, based on the result of detection of the target object images by the target object detecting section, the calibration determining section determines a timing for at least starting or ending the accumulation of the vertical position misalignment amounts.

3. The information processing device according to claim 2, wherein
the target object detecting section detects, as the target objects, images of a plurality of markers arranged in a predetermined manner on and attached to a surface of an object, and
based on the number of marker images detected by the target object detecting section, the calibration determining section determines the timing for starting and ending the accumulation of the vertical position misalignment amounts.

4. The information processing device according to claim 1, wherein the calibration determining section acquires a differential value in vertical position coordinates between corresponding images of each of the target objects detected in the stereoscopic images from the plurality of frames and determines the effective position misalignment amount based on information indicative of a frequency of each of the differential values.

5. The information processing device according to claim 4, wherein, based on the result of detection of the target object images from each of the frames by the target object detecting section, the calibration determining section weights the frequency to be incremented for each of the differential values.

6. An information processing method performed by an information processing device configured to acquire position information about a target object from images acquired by a stereo camera for information processing, the information processing method comprising:
detecting images of the target object from stereoscopic images acquired by the stereo camera from right and left points of view and acquiring, based on a result of detection of the target object images, position information about the target object for use in the information processing;
monitoring, in parallel with the acquiring of the position information and based on the result of detection of the target object images, an amount of vertical position misalignment between the stereoscopic images and determining that camera calibration is needed if the position misalignment amount meets a predetermined condition; and
outputting, if the camera calibration is determined to be needed, information about the determined need,
wherein the monitoring includes cumulatively recording amounts of vertical position misalignment between the stereoscopic images from a plurality of frames in a moving image acquired by the stereo camera over numerous calibration cycles, and determining an effective position misalignment amount for use in determining whether or not the camera calibration is needed on the basis of the accumulated vertical position misalignment amounts.

7. A non-transitory, computer-readable recording medium containing a computer program, which when executed by a computer, causes the computer to acquire position information about a target object from images acquired by a stereo camera for information processing by carrying out actions, comprising:
- detecting images of the target object from stereoscopic images acquired by the stereo camera from right and left points of view and acquiring, based on a result of detection of the target object images, position information about the target object for use in the information processing;
- monitoring, in parallel with the process of acquiring the position information and based on the result of detection of the target object images, an amount of vertical position misalignment between the stereoscopic images and determining that camera calibration is needed if the position misalignment amount meets a predetermined condition; and
- outputting, if the camera calibration is determined to be needed, information about the determined need,
- wherein the monitoring includes cumulatively recording amounts of vertical position misalignment between the stereoscopic images from a plurality of frames in a moving image acquired by the stereo camera over numerous calibration cycles, and determining an effective position misalignment amount for use in determining whether or not the camera calibration is needed on the basis of the accumulated vertical position misalignment amounts.

* * * * *